United States Patent [19]
Moore

[11] 3,935,415
[45] Jan. 27, 1976

[54] ELECTROMAGNETIC OVEN WHICH SUPPLIES DIFFERENT AMOUNTS OF HEAT TO ITEMS POSITIONED IN DIFFERENT REGIONS OF A SINGLE HEATING CHAMBER

[75] Inventor: Donald G. Moore, Glencoe, Ill.

[73] Assignee: Chemetron Corporation, Chicago, Ill.

[22] Filed: July 18, 1973

[21] Appl. No.: 380,487

Related U.S. Application Data

[63] Continuation-in-part of Ser. No. 300,763, Oct. 25, 1972.

[52] U.S. Cl.................. 219/10.55 F; 219/10.55 E
[51] Int. Cl.² ........................................ H05B 9/06
[58] Field of Search ............... 219/10.55, 10.55 E

[56] References Cited
UNITED STATES PATENTS

| | | |
|---|---|---|
| 3,271,169 | 9/1966 | Baker et al.................. 219/10.55 E |
| 3,302,632 | 2/1967 | Fichtuer...................... 219/10.55 E |
| 3,353,968 | 11/1967 | Krajewski.................... 219/10.55 E |

FOREIGN PATENTS OR APPLICATIONS

| | | |
|---|---|---|
| 39,987 | 11/1965 | Japan .......................... 219/10.55 R |

*Primary Examiner*—Bruce A. Reynolds
*Attorney, Agent, or Firm*—N. M. Esser

[57] ABSTRACT

An electromagnetic oven supplies differing quantities of electromagnetic heating energy to a variety of load items or the like all of which are located within the oven cavity. In one embodiment, a food bearing tray has a first region substantially shielded from the electromagnetic heating energy by means of a conductive shield which cooperates with a shaped interior wall of the oven to provide a desired nonuniform distribution of electromagnetic energy over those regions of the tray which are not shielded. A much higher energy concentration is developed, for example, at a region near a distended wall so that a food item located in that region is heated to a higher temperature than other food items upon the tray and in other regions.

2 Claims, 14 Drawing Figures

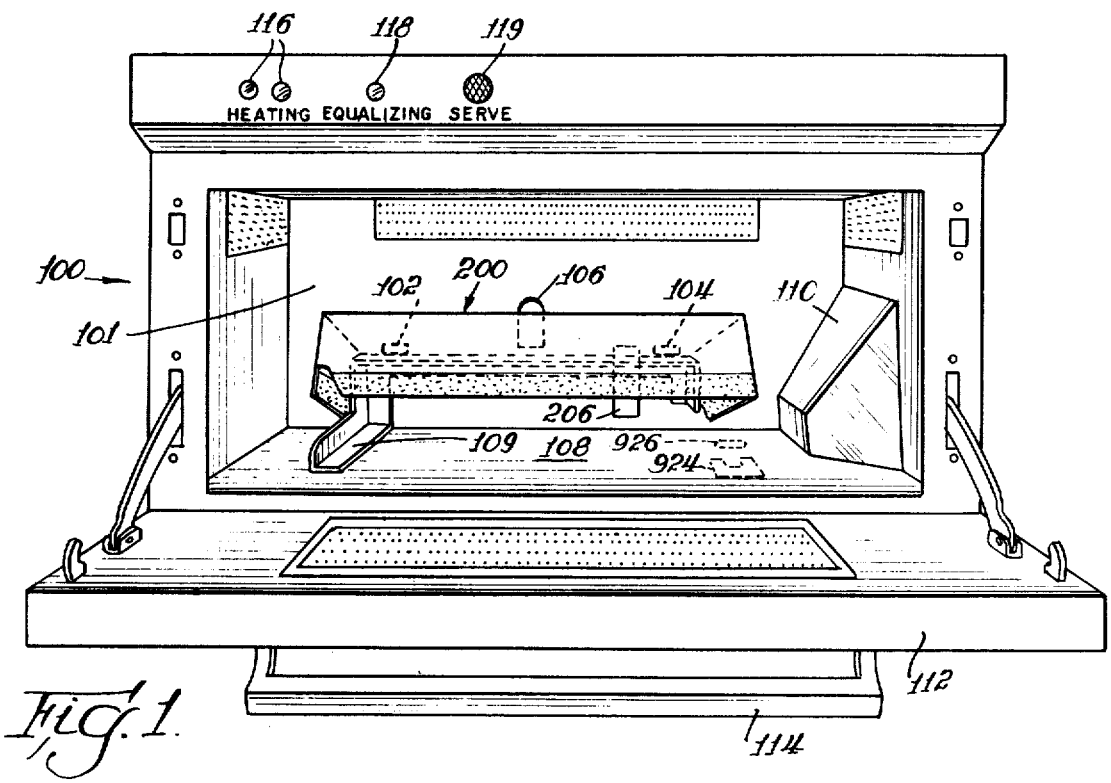
Fig. 1.
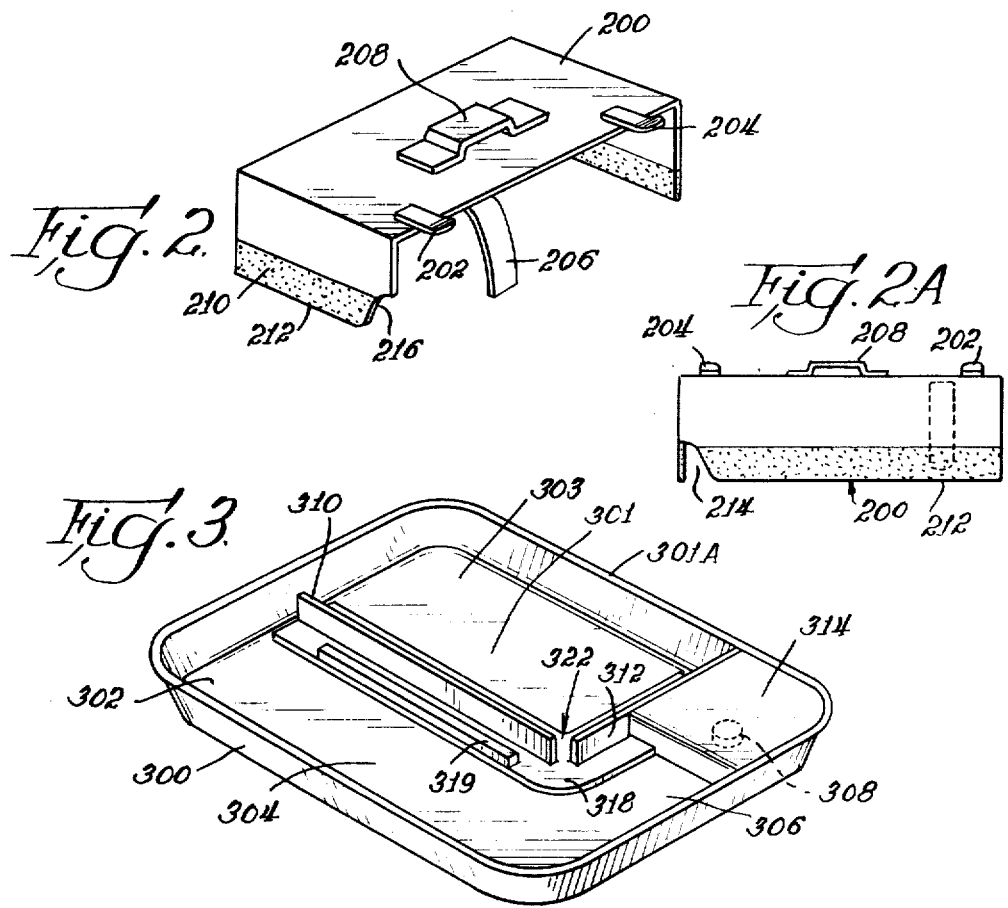
Fig. 2.
Fig. 2A.
Fig. 3.

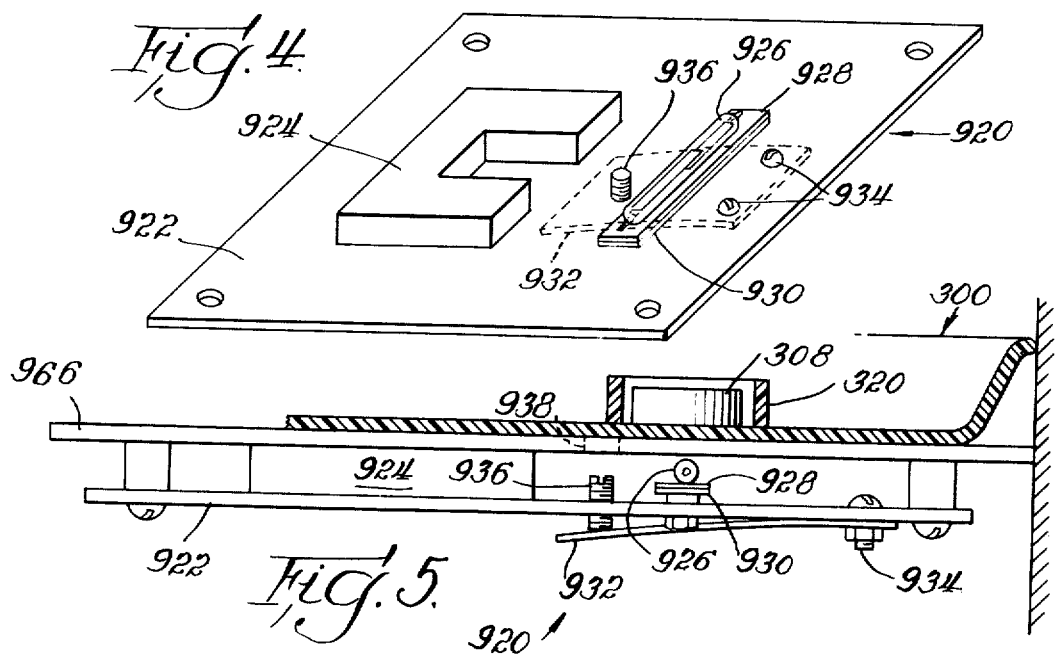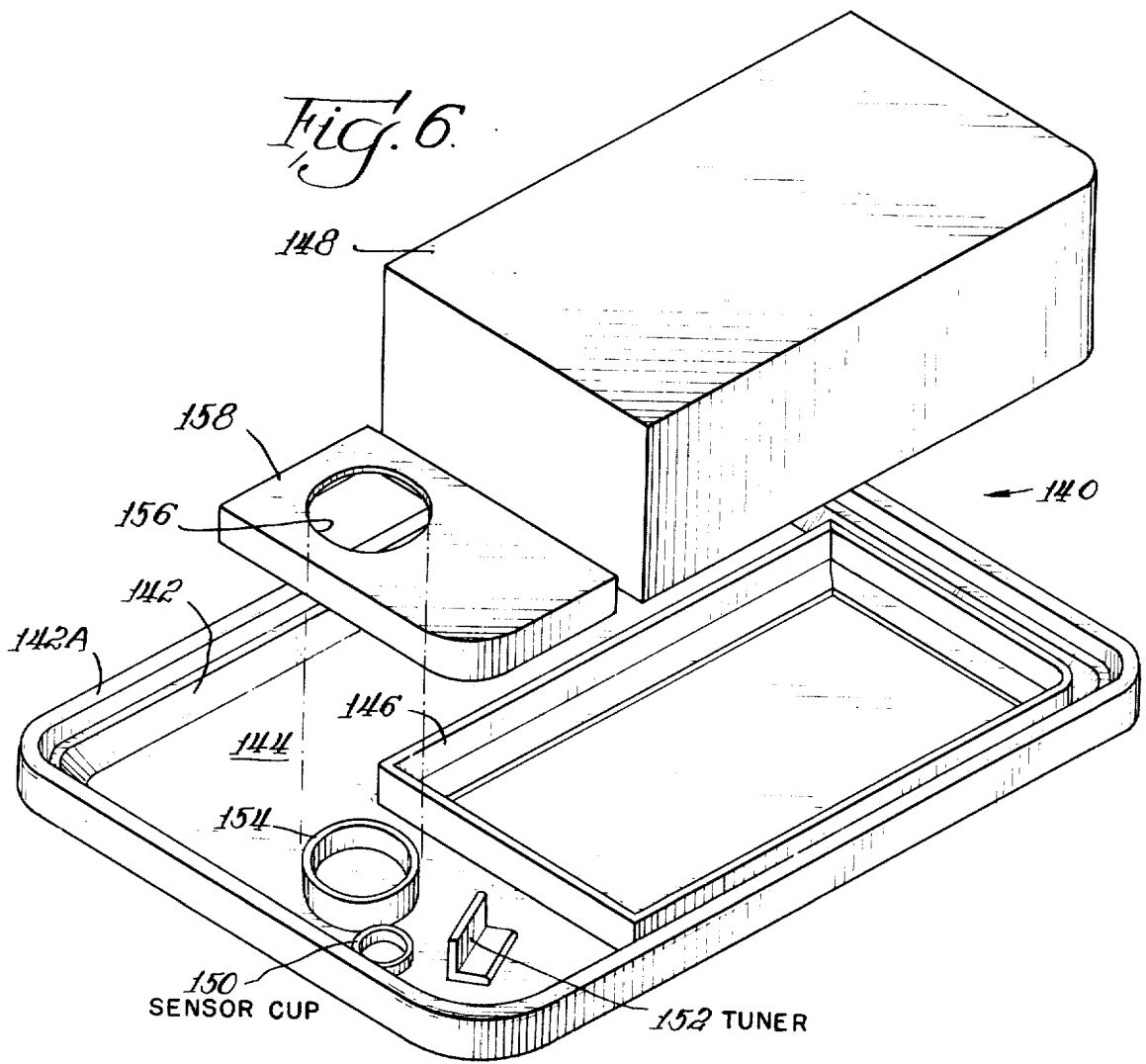

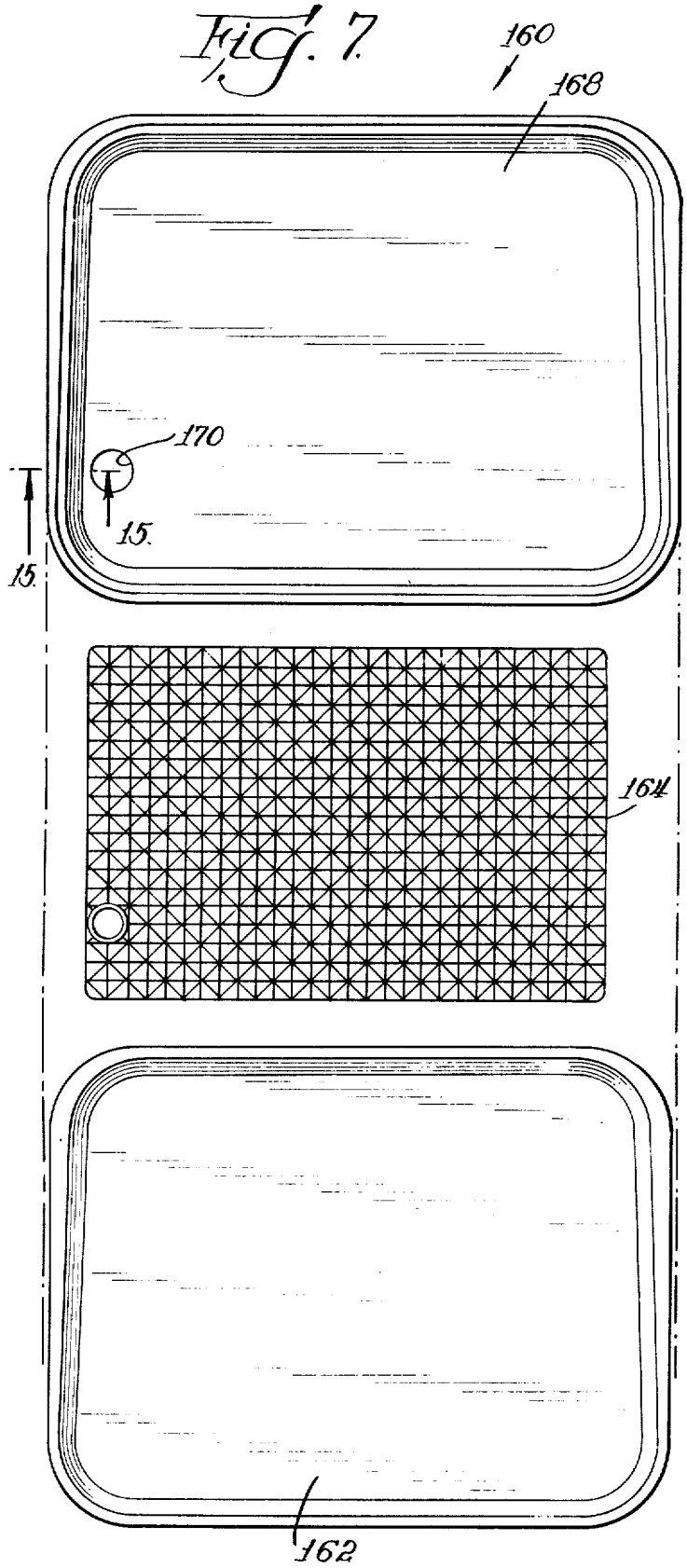
Fig. 7
Fig. 9
Fig. 10
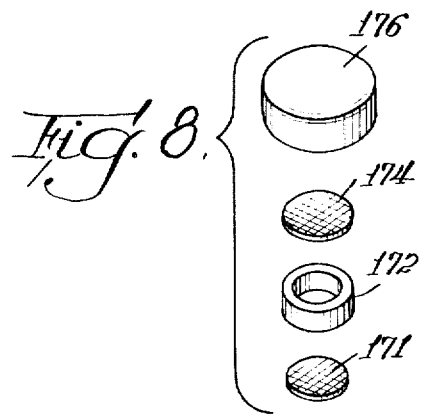
Fig. 8
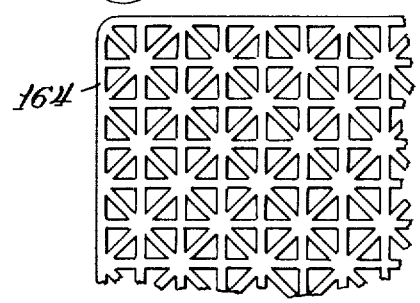
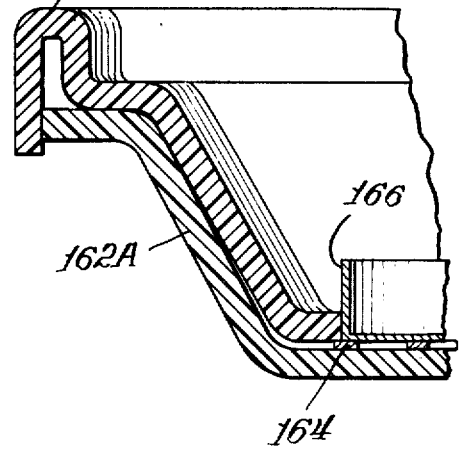

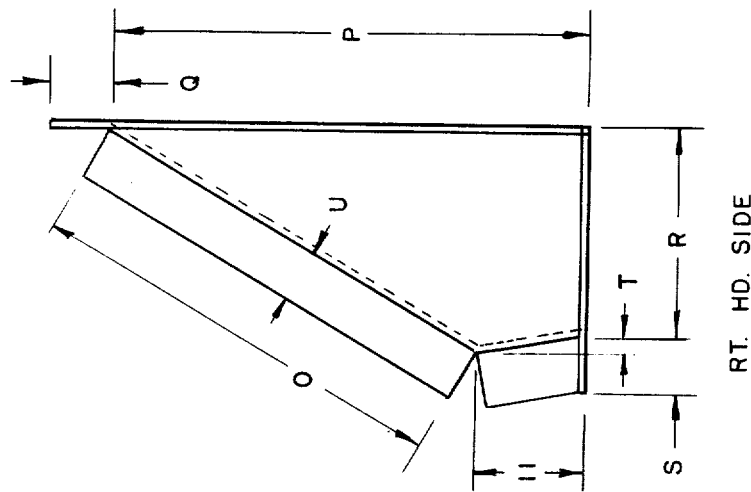
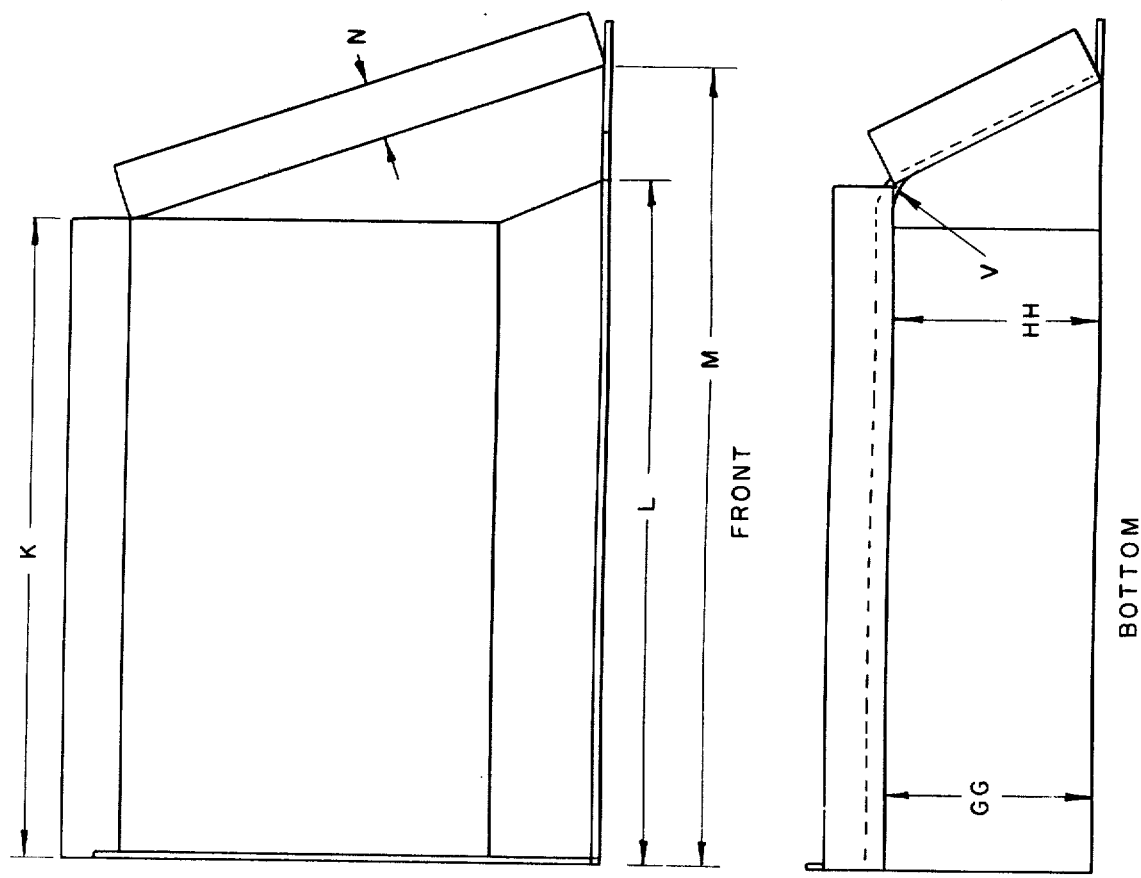
Fig. 13

ELECTROMAGNETIC OVEN WHICH SUPPLIES DIFFERENT AMOUNTS OF HEAT TO ITEMS POSITIONED IN DIFFERENT REGIONS OF A SINGLE HEATING CHAMBER

CROSS REFERENCE

This application is a continuation-in-part of application Ser. No. 300,763 filed Oct. 25, 1972.

A control system designed for use with the present invention is disclosed in application Ser. No. 380,187 filed on the same day as the present application by the present applicants which issued on Dec. 10, 1974 as U.S. Pat. No. 3,854,022. A mechanical mechanism for controlling the operation of the shielding box is disclosed in an application of the present applicant and William E. Leyers application Ser. No. 380,188 filed on the same day as the present application which issued on Dec. 10, 1974 as U.S. Pat. No. 3,854,021. The present application and all of the above applications are assigned to a common assignee.

BACKGROUND OF THE INVENTION

The present invention relates to electromagnetic energy heating systems, and more particularly, to microwave systems which heat in a single operation a plurality of items not all of which are to be heated to the same temperature.

In institutions, such as hospitals, it is desirable to provide a means whereby a complete meal may be brought up to serving temperature in a single, quick operation. If this can be done, meals may be prepared in an assembly-line fashion on weekdays and during normal working hours. The meals may then be kept refrigerated until the time when they are to be served.

The temperature at which food items are to be served varies according to custom and taste but generally water for a hot beverage should be near its boiling point. A thick soup may be served at about 160° F. whereas a thin soup or broth is perferably somewhat warmer, for example, at about 170° F. The temperature of an entree is controlled, to some extent, by its type since certain meats and vegetables do not tolerate heat as well as others. Potatoes and beef, for example, should be in a range of 140° F. to 160° F., but chicken is satisfactory as warm as 190° F. A starch dish, such as potatoes, is preferably heated to about 170° F.

In recent years, microwave ovens and other electromagnetic heating devices have come into widespread use for the quick cooking or reheating of food items. These ovens typically include a rectangular oven chamber having a door through which food items may be placed into the chamber for cooking or heating. Such ovens normally include a timer which may be set to control the length of the time during which electromagnetic energy is supplied to food items placed within the oven chamber. Such an oven is not normally suitable for heating a complete meal in a single operation because all of the food items present within such an oven are heated to about the same temperature.

Many attempts have been made to devise means whereby the amount of energy supplied to the various food items within the oven chamber may be controlled so that an entire meal can be brought to serving temperature in a single heating operation. The prior art is replete with various systems for achieving this end which involve either the shielding of food items from electromagnetic radiation or the incorporation into the food of some energy-absorbing item which subjects particular food items to additional heating. For example, Peter N. Stevenson discloses in his U.S. Pat. Nos. 3,547,661 and 3,615,713 the technique of enclosing food items which are to be completely shielded from radiation in a conductive wrapper or the like and wrapping items which are to receive less heat in conductive wrappers containing perforations which allow greater or lesser amounts of energy to reach the various food items in accordance with their nature. This technique for controlling the heating of the various items is relatively expensive to implement, since it requires the various food items to be individually wrapped in a rather specialized manner or, alternatively, requires the provision of specially constructed metallic shields for the food trays which are to be heated. As another example, U.S. Pat. No. 3,353,968 discloses a method of using dielectric material to supply more heating energy to certain items than to others. U.S. Pat. No. 3,302,632 discloses a food tray having separate compartments for different food items under which compartments are buried metallic grids which reduce the amount of energy reaching the food items in the corresponding compartments. Numerous other such arrangements are known, but in general they all require the use of either a very special form of tray having shielding or energy concentrating elements embedded therein or else the selective wrapping and packaging of the food items which are to be placed upon the tray. All of these arrangements increase the cost of prepackaging meals and, consequently, are undesirable.

SUMMARY OF THE INVENTION

A primary object of the present invention is therefore the achievement of an electromagnetic heating system which heats complete loads to desired temperatures and which supplies differing quantities of energy to load items located in different regions of the heating cavity. The distribution of energy within any given region is relatively uniform so that the positioning of load items within a region is not critical.

Another object of the present invention is the provision of an electromagnetic heating system which heats complete meals to serving temperature and which supplies differing quantities of energy to food items located in different regions of the heating cavity.

Another object of this invention is the provision of an apparatus for simultaneously heating, without individual shielding, a main food dish to a temperature from about 140° to 170° F. and beverage water to about 210° F.

The invention includes a method for heating items with microwave energy in a cavity comprising the steps of locating the items in a predetermined array within the cavity, developing a non-uniform but predictable distribution of energy within the cavity, and heating the objects to a nonuniform temperature in accord with the selected energy distribution and object placement.

In one embodiment the invention includes a method of directing energy to a ferrite sensor and terminating the heating step after the ferrite sensor has reached a temperature above its Curie Point.

The oven comprises a microwave oven having electrically conductive walls defining a generally rectangular heating chamber into which microwave energy at 2,450 mH$_z$ is fed from a suitable microwave power source.

Food items are generally grouped into regions upon the tray in accordance with the quantity of energy they are to receive. Items which are to be served cold are preferably grouped together in a first region, and items which are to be heated moderately are grouped together in a second region. Items which are to be heated to the highest temperature are positioned in a third, preferably smaller region of the tray that is somewhat removed from the other two regions. Within each general region, the food items may be arbitrarily positioned to improve the asthetic appearance of the meal.

The first region is covered with an electrically conductive shield which cooperates with the electrically conductive oven floor to substantially prevent electromagentic radiation from reaching items in the first region. In one embodiment of the invention the floor of the shield comprises an electrically conductive lamination in the tray. In a preferred embodiment of the invention, the shield covers slightly less than half of the tray's surface area and is located over one corner of the tray.

The remaining non-shielded surface area of the tray is the L-shaped region which surrounds the shielded region. Items which are to moderately heated are placed upon a region of the tray which corresponds to the longer leg of the L-shaped region, and items which are to be subject to maximum heating are placed upon a region of the tray which occupies the shorter leg of the L-shaped region.

In order to supply more energy to those items located along the shorter leg of the L-shaped region, the internal geometry of the oven chamber is preferably modified from a generally rectangular cavity so as to create an energy focusing or concentrating effect at a selected region. The conductive oven wall adjacent this region is brought inwards more at the bottom of the oven than at the top and desirably is brought closer to the tray at the back of the tray than at the front to provide an extending edge.

In accordance with another aspect of the present invention it is contemplated that each tray has attached to it a sensor responsive to microwave energy. The energy sensor, in combination with other oven control system elements, adjusts the length of time that a meal is heated in accordance with the size and initial temperature of the meal. When used in the oven of this invention which has a nonuniform energy distribution, the amount of energy which the sensor receives may be adjusted by repositioning the sensor within the cavity to a region of higher or lower energy concentration.

It is contemplated that different configurations of regions upon a tray than those described may require different configurations of the oven interior so as to supply the desired amount of energy to the various food items. These and other modifications apparent to those skilled in the art are within the scope of the invention. Additional features, objects and advantages of the invention are presented in the detailed description which follows. The features of novelty which characterize the invention are pointed out with particularity in the claims annexed to and forming a part of this specification.

BRIEF DESCRIPTION OF THE DRAWINGS

For a better understanding of the invention, frequent references will be made to the drawings wherein:

FIG. 1 is a front perspective view of a microwave oven constructed in accordance with the teachings of the present invention;

FIG. 2 is an isometric view of a shield which is located to protect certain food items resting upon the tray shown in FIG. 3;

FIG. 2A is a front, elevational view of the shield shown in FIG. 2;

FIG. 3 is an isometric view of a tray for use in the oven shown in FIG. 1, additionally adapted to engage the shield shown in FIG. 2 and also to carry a ferrite oven control sensor;

FIG. 4 is an oblique view of a detector assembly.

FIG. 5 illustrates the relative positions of a magnet, a reed switch, and the tray-mounted ferrite sensor when a tray is placed within the oven shown in FIG. 1;

FIG. 6 illustrates a modified tray suitable for use in an oven similar to that shown in FIG. 1 which includes a shield that may be manually placed upon or removed from the tray;

FIG. 7 is an exploded view of a radiation opaque tray construction;

FIG. 8 is an exploded perspective view of a sensor assembly used with the tray shown in FIG. 7;

FIG. 9 is an enlarged fragmentary plan view of a metal grid used in the tray shown in FIG. 7;

FIG. 10 is an enlarged sectional view taken along the line 15—15 in FIG. 7 assuming that the tray components are assembled;

FIG. 13 illustrates the dimensions of an insert which may be placed within a rectangular oven cavity to create a nonuniform energy distribution pattern.

DESCRIPTION OF THE PREFERRED EMBODIMENT

Figure 11:
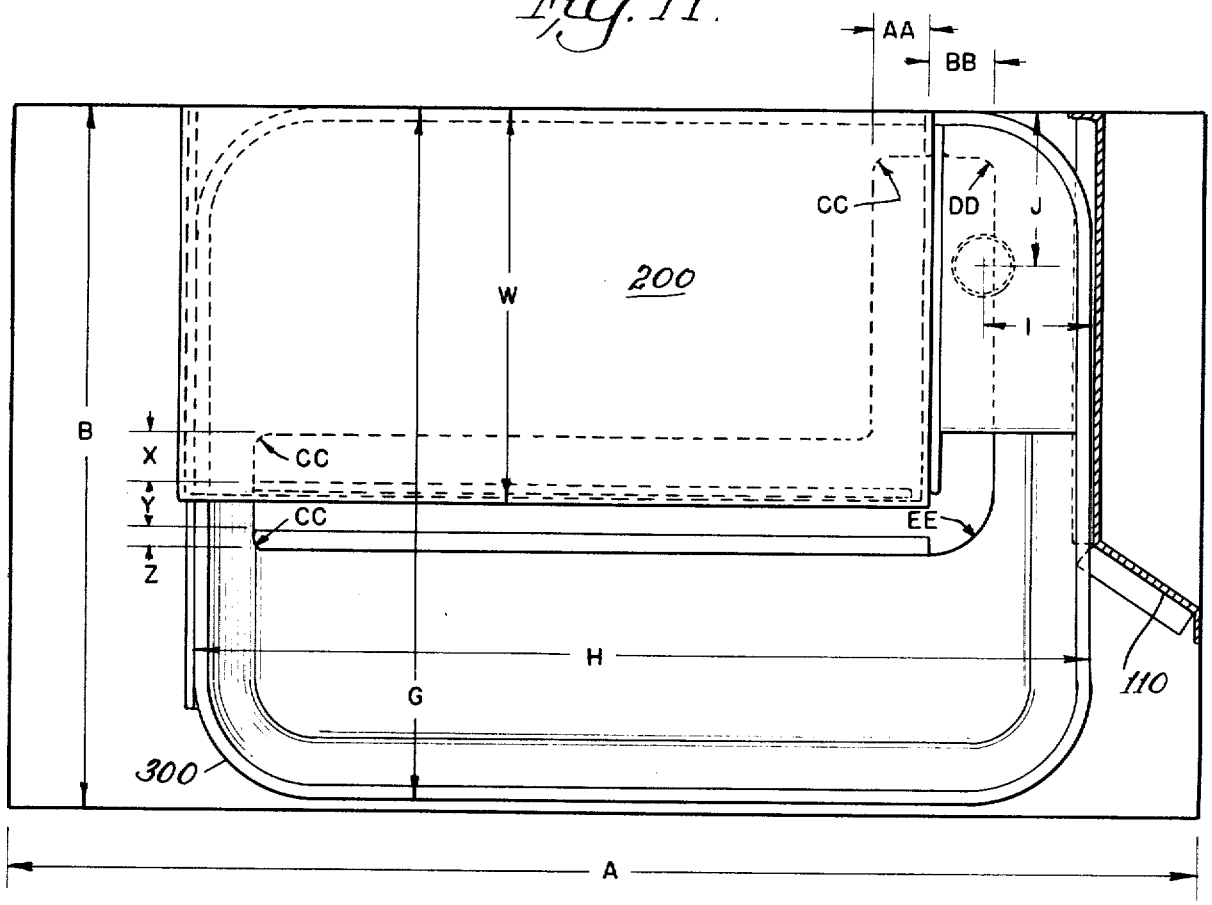
FIGS. 11 and 12 illustrate the dimensions of the oven, shield, tray, and distended oven wall.

The preferred embodiment of the invention is a modified version of a conventional microwave oven. A suitable oven is a system 70/80 MenuManster oven sold by the Atherton Division of Litton Industries, Inc., Minneapolis, Minnesota, but other conventional microwave ovens may also be used in constructing the invention.

Referring now to the drawings, therein is illustrated an oven 100 (FIG. 1) having electrically conductive walls to accept food items distributed over a tray as described below. The rear wall 101 of the oven has sockets 102 and 104 between which extends a movable tongue 106. The floor 108 of the oven 100 is constructed from an electrically conductive non-magnetic material. The oven floor 108 and rear wall 101 cooperate with a shield 200 (FIG. 2) to form a substantially closed, electrically conductive enclosure.

An angle 109 secured to the floor 108 and extending up and across the rear wall 101 acts as a guide for a tray 300 and aids in sealing the shield 200.

Figure 12:
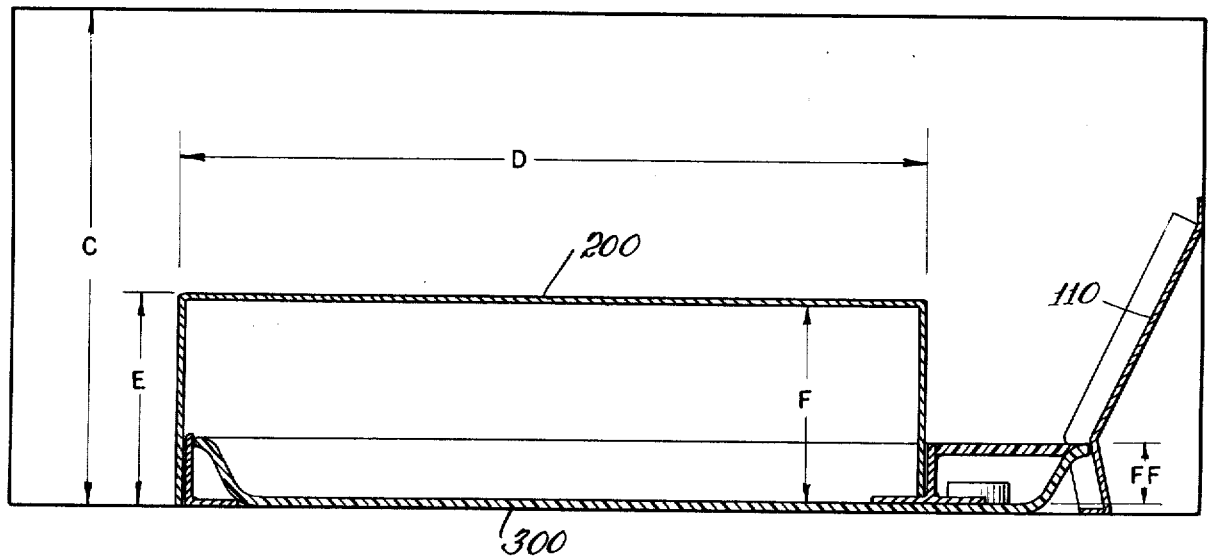

The portion 110 of the oven wall is distended into the heating cavity or, alternatively, an insert illustrated in detail in FIGS. 11-13 may be placed within the oven cavity and secured in electrically conductive relation to the wall. This distended portion 110 covers about 50 percent of the surface area of the wall and comprises substantially planar sections. The distended portion 110 creates a non-uniform energy distribution pattern within the oven and, especially in cooperation with the shield 200 that is implaced on the tray 300 as is discussed below, creates a high energy concentration adjacent itself and the shield 200. Dotted lines at 924 and 926 indicate elements of the control mechanism which cooperate with a sensor that is carried by the tray 300 to control oven operation. Indicator lights 116, 118 and 119 disclose the condition of the oven operating sequence. Microwave energy is supplied by two magnetrons arranged to be operated singly or in unison.

FIG. 2 depicts the shield 200 which includes rearwardly extending fingers 202 and 204 which engage the corresponding sokcets 102 and 104 on the rear wall 101 of the oven. A bracket 208 secures the shield to the tongue 106. A leaf spring 206 depends within the shield 200 and, in part, lowers the shield when a tray is in the oven. The shield 200 covers about 30 percent of the oven floor area and fills about 15 percent of the oven volume. The shield 200 is spaced from the distended portion 110 by a distance equal to about one wavelength.

The shield 200 has its lower edges 212 coated with an electrical insulator 210, e.g., Teflon tape to prevent arcs from forming between the shield 200 and the angle 109, the upstanding flanges 310 and 312 on the tray 300, or the strip 318 on the tray 300 (FIG. 3). The shield 200 is so arranged within the oven 100 that when lowered into position over a tray, it creates a region shielded from the electromagnetic radiation that is developed within the oven 100.

Portions of the shield corners 214 and 216 are provided with contours which compliment the edges of the tray against which it is located in the protecting position. In alternate embodiments, a plurality of leaf springs of similar configuration to the leaf spring 206 may assist in lowering the shield. The bracket 208 may be formed integrally with the top of the shield.

The tray 300, shown in a preferred embodiment in FIG. 3, has an upper side 301 and edges 301A. An L-shaped conductive strip 318 on its upper side 301 supports a pair of conductive, upstanding flanges 310 and 312 which in part define regions 302, 303, 304 and 306 within which load items may be placed. The strip 318 also provides coupling to the cavity floor for microwave energy. Since the flanges 310 and 312 engage the shield 200 on opposite surfaces, it is necessary to have the two flanges 310 and 312 separated from one another by a notch 322.

The flanges 310 and 312 and the strip 318 have dimensions, including radii, which are selected to reduce field concentrations and to effect an electromagnetic energy seal with the floor of the oven and with the front and side walls of the shield 200. The body of the tray 300 is constructed from polyester fiber glass which has excellent mechanical strength but only fair dielectric properties. A barrier 319 serves to direct load items to locations where they will not interfere with the lowering of the shield 200. In a preferred embodiment, a ferrite sensor 308 is cemented or otherwise attached to each tray 300 and is part of the oven control system. a cover 314 overlies the sensor 308 to provide mechanical protection in addition to regulating the amount of microwave energy which reaches the sensor 308.

FIG. 6 of the drawings illustrates another form of tray assembly indicated generally at 140 which may be used in an oven 100 that is not equipped with an automatically positionable shield 200. The tray assembly 140 includes a tray base 142 made, for example, of a fiber glass material having a flanged edge portion 142A. Disposed within the flange edge portion 142A on the bottom wall of the tray base 142 is an preferred layer 144 of electrically conductive material, such as aluminum, which renders the tray assembly 140 substantially opaque to radiation. Disposed on the wall or layer 144 is a base or frame 146 of electrically conducting material such as aluminum angle which locates and positions on the tray 140 a removable cover or enclosure 148 that is also made of electrically conductive material such as aluminum. As in the case of the tray 300, those items that are not to be heated are disposed in random positions within the base 146, and the cover or enclosure 148 is then disposed on the base 142 in a position determined by engagement with the lower portion of the cover 148 nesting around the base 146. Since the tray 142 is made opaque to radiation by the layer or sheet 144, no significant radiation is received by those food items disposed within the cover 148. Electrical connection between the cover 148 and the base 146 prevents any arcing which may result in deterioration of the tray assembly 140. Alternatively, the edges of the cover 148 may be coated with an insulating layer such as that shown on the shield 200 in FIG. 2.

Mounted upon the tray 142 is an aluminum cup 150 in which is disposed a sensor assembly such as that illustrated in FIG. 8 and described hereafter. A conductive or dielectric tuning element 152 may be disposed in a desired position relative to the cup 150 to control the amount of radiation received by the sensor within the cup 150 so as to effect control over the heating and equalizing cycle to which the food components on the tray assembly 140 may be subjected. A plastic or transparent cup or glass holder 154 may also be mounted on the tray aligned with an opening 156 in a control module cover 158 so that when the cover 158 is placed over the components 150, 152 and 154, the opening 156 is aligned with the holder 154. This permits a container of, for example, water or coffee to be positively located on the tray assembly 140. This is desirable when the cup of water is close enough to the cup 150 so as to affect the control action exerted by the sensor within the cup 150.

FIGS. 7 through 10 of the drawings illustrate an improved tray construction which is indicated generally as 160 and which can be used, for example, as a tray 300. The tray construction 160 is of a laminated construction including a tray base 162 formed, for example, of fiber glass having a dished or flanged and tapered outer edge 162A. Disposed on the bottom wall of the tray base 162 is an electrically conductive cup 166 open at its upper end for receiving the remaining components of a sensor assembly that is depicted in FIG. 8. A metal grid 164 can comprise, for example, an aluminum material having a thickness of around 0.02 inches. Superimposed upon the tray base 162 and the metal grid 164 is a tray cover 168 with a flanged and reentrant edge 168A for receiving the edge portion of the flange 162A on the tray base. The tray cover 168 also includes an opening 170 aligned with and through which extends a sensor-receiving cup 166. The cover 168 can be formed, for example, of polystyrene. The components 162, 164 and 168 are suitably secured together as by the use of adhesive material.

In the assembly of the tray 160, a glass fiber spacer 171 is placed in the bottom of the cup 166, which cup is electrically connected to the grid 164. An annular ferrite body 172 is placed on the spacer 171, and another glass fiber spacer or washer 174 is placed on top of the annular ferrite body 172. An electrically insulating cover 176 is placed over the cup 166 and secured thereto to complete the assembly of the sensor.

The fiber glass material of the base 162 provides mechanical stability and electrical insulation of the metal grid 164 from the metal oven deck. The metal grid 164 in turn provides a fixed ground plane for the disher and also for the metal cup 166 containing the ferrite body 172, which ground plane does not change spacing as the tray assembly 160 is warped or becomes bent. The polystyrene material of the tray cover 168 has sufficient dielectric strength and low loss to accomodate the high voltages experienced, particularly with metal food containers. This material prevents high currents and arcing problems which frequently are encountered when metal containers rest lightly upon a conducting surface. In addition, the flanged edge portions 162A, 168A of the tray assembly 160 may be angled inwardly with the tray guide panels in the microwave oven angled accordingly to insure that the tray assembly can be inserted into the oven only with the particular orientation that places the ferrite body or sensor 172 in proper position relative to the oven control 920 shown in FIG. 4.

FIGS. 11, 12 and 13 set out the dimensions of the oven 100, the shield 200, the tray 300, and the distended portion 110 of the oven wall which, in a preferred embodiment of the invention, is formed by an insert placed into an otherwise rectangular oven cavity. This insert is preferably constructed from a material identical to that from which the oven walls are constructed and is desirably welded to the oven walls. Alternatively, the oven wall itself may be formed to the desired shape.

By way of example and not by way of limitation, the following dimensions are applicable to FIGS. 11, 12 and 13 and further describe the preferred embodiment of the invention. All dimensions given below are in inches. In those cases where the dimensions are not in precise accord with the figures as drawn, the dimensions are controlling. For example, the dimensions GG and HH indicate correctly that the edge of the distended portion 110 adjacent the tray is not precisely parallel to the side wall of the oven. In the figures, this edge is drawn parallel to the side wall of the oven. Slight deviations from the precise dimensions given below will not normally interfere with the functioning of the invention. It will be apparent to those skilled in the art that these dimensions may be modified without departing from the spirit of the invention.

1. Oven chamer
   A — 24         (FIG. 11)
   B — 14         (FIG. 11)
   C — 10         (FIG. 12)
2. Shield 200
   D — 14-3/4     (FIG. 12)
   E — 4-1/8      (FIG. 12)
   F — 3-7/8      (FIG. 12)
   W — 7-7/8      (FIG. 11)
3. Tray 300
   G — 13-7/8     (FIG. 11)
   H — 17-7/8     (FIG. 11)
4. Ferrite sensor 308 coordinates with respect to tray
   I — 2-1/4      (FIG. 11)
   J — 3-1/4      (FIG. 11)
5. Insertable distended portion 110 (FIG. 13)
   K — 8-12       (Front view)
   L — 9-1/8      (Front view)
   M — 10-5/8     (Front view)
   N — 3/4        (Front view)
   O — 6          (Right-hand side view)
   P — 6-5/16     (Right-hand side view)
   Q — 3/4        (Right-hand side view)
   R — 3-1/16     (Right-hand side view)
   S — 3/4        (Right-hand side view)
   T — 3/16       (Right-hand side view)
   U — 3/4        (Right-hand side view)
   V — 1/4 radius (Bottom view)
   GG — 3         (Bottom view)
   HH — 2-3/16    (Bottom view)
   II — 1-1/8     (Right-hand side view)
6. L-shaped strip 318 (FIG. 11)
   X — 1-1/4
   Y — 7/8
   Z — 3/8
   AA — 1-1/4
   BB — 1-1/4
   CC — 1/2 radius
   DD — 1 radius
   EE — 1-1/4 radius
7. Height of upstanding flanges 310, 312 (FIG. 17)
   FF — 11/16

The ferrite sensor rests in an aluminum open-top cup 320 (FIG. 5) that is 1-¼ inch in diameter and ½ inch high having walls 0.01 inches thick.

The above dimensions have proved satisfactory in an oven that is supplied with microwave energy at a frequency of about 2,450 mH$_z$ from two magnetrons both of which feed energy down into the oven chamber from above.

FIGS. 4 and 5 of the drawings illustrate the structural details of the detector assembly which is indicated by elements 924 and 926 in FIG. 1 and which is identified generally as 920 in FIG. 4. The detector assembly 920 includes a non-magnetic or brass supporting plate 922 secured to the underside of the oven's electrically conductive non-magnetic floor 966. A permanent magent 924 is carried by the supporting plate 922. Spaced laterally from the permanent magent 924 but within the influence of its magnetic field is a sealed-magnetic-reed-switch detector 926 of conventional construction. The detector 926 is a reed switch model MSRR-2-185 sold by Hamlin, Incorporated, of Lake Mills, Wisconsin (53551). This reed-switch detector rests on a plastic plate 928 which, in turn, rests on a magnetically premeable field-focusing plate or element 930. The plates 928 and 930 are suitably mounted on the supporting plate 922, and the reed switch detector 926 is electrically connected by wires (not shown) to an oven control circuit which is fully described in the concurrently-filed application of the present inventor that is cited at the beginning of this specification. The reed-switch detector 926 is disposed in position to be located beneath the ferrite sensor 308 which is carried by a tray 300 when such a tray is present within the oven cavity.

When the ferrite sensor is either absent or above its Curie Point, the permanent magnet 924 causes the contacts of the reed-switch detector 926 to be closed. When, however, the cool ferrite sensor 308 is disposed in its proper position relative to the reed-switch detector 926 on insertion of a tray 300 into the oven cavity, the magnetic field of the permanent magnet 924 is sufficiently shunted and the reeds within the detector 926 are moved to their normal spaced position.

According to this invention, the shield 200 creates a long channel around which food may be placed. The shield cooperates with the contours of the oven wall to concentrate energy within that channel and to produce regions within the oven into which items may be placed in accordance with their heating requirments. The resulting energy distribution pattern is surprisingly stable and is not particularly sensitive to the point at which energy is fed into the oven. The distribution is also relatively insensitive to the presence or absence of food items in the various regions. The oven 100 may thus be used to re-heat a wide variety of different food combinations.

The following experiments illustrate the characteristics of the microwave heating system of this invention. In a preliminary series of experiments it was empirically determined that in the presence of heating quantities of microwave energy, an entree was simulated by 5 ounces of salt water in a china dish and "soup" was simulated by 6.2 ounces of salt water in a bowl of foamed plastic; beverage water comprised 6.8 ounces of water which stood to a depth of 3 inches in a ceramic mug. On a tray as shown in FIG. 3, the "entree" was placed in the heating zone 304 and the beverage in the region 306. After the tray and the "food items" were brought to a uniform temperature of about 70° F., a shield was set over the region 303, the assembly was then placed into an oven of the typed illustrated in FIG. 1, and both of the oven magnetrons were operated for a timed interval of 30 seconds. The tray was withdrawn and the "entree" was found to have a temperature 170° F. and the beverage a temperature of 190° F. The experiment was repeated with "soup" in the heating region 304 and the beverage in the heating region 306. After 30 seconds of heating, the "soup" was found to have a temperature of 172° F. and the beverage water was found to be 200° F.

In a controlled experiment in which the tray and items were arranged as described above but the oven was not fitted with the distended wall portion 110, heating the "entree"-beverage pair developed a temperature of 185° F. in the entree and 170° F. in the beverage. Thus, the "entree" was too hot and the beverage was too cool. The "soup"-beverage pair, when heated, resulted in a beverage temperature of 190° F. and a "soup" temperature of 180° F. These are not desirable relative temperatures for serving these foods.

In another experiment the "entree" and beverage were located as described above and placed into an oven having a distended wall portion 110 and a shield covering the region 303. Only one oven magnetron was operated for 60 seconds. When the tray was removed from the oven, the temperature of "entree" was about 165° F. and the beverage was about 200° F. After the experiment was repeated with the "soup" and beverage present on the tray, the soup had a temperature of about 160° F. and the beverage was at its boiling point.

The heating of the following meals further illustrates the apparatus and method of this invention.

The following items of prepared food and accessories were arranged on a tray of the type illustrated in FIG. 3. A single dish containing pot roast and gravy, mashed potatoes, and carrots was located in the region 302; a bowl of Scotts' broth was located in the region 304; and a mug of beverage water was located in the region 306 in the corner near the sensor. Within the region 303 defined by the flanges 310 and 312 were located a salad, iced tea, pie, metal tableware, a napkin, and packets of salt, pepper and sugar.

The tray carrying the food and the ferrite sensor 308 was stored at 40° F. After removal from the refrigerator, a moist wash cloth was placed on the tray adjacent to the beverage mug. The tray was inserted into the oven, a shield was positioned over the protected region 303 and the door was closed and the oven activated. The initial heating interval of 1 minute, 51 seconds was followed by an equalizing interval of 17 seconds and a heating interval of 15 seconds, all of which intervals were controlled by the ferrite element and an associated oven control system. At the end of the second heating interval, the oven was opened, the tray was withdrawn, and the temperatures of the various food items were measured with a dial thermometer. The food in the entree dish was at about 160° F., the broth was at about 195° F., the water was at about 210° F., the wash cloth was at about 160° F. The items within the shielded region 303 had not changed temperature noticeably.

Another meal was prepared for serving as follows. A single plate containing baked chicken, whipped potatoes and peas and pimento was located in the region 302 (FIG. 3), a bowl of Scotts' broth was located at about the middle of the tray in the region 304, and a cermic mug of water for a beverage was located in the region 306. The protected region 303 contained a salad, a roll, butter, metal tableware, condiments and napkin. The food, along with the tray and its sensor, were initially refrigerated to 40° F. After the tray was removed from the refrigerator, an insulated cup of ice cream was placed into the cold region 303. The tray and its contents were then inserted into the oven, a shield was lowered over the protected region 303, the oven door was closed, and the heating cycle was initiated. An initial heating interval of one minute, 45 seconds was followed by an equalizing interval of 21 seconds and a second heating interval of 15 seconds. The length of all these intervals were controlled by a ferrite sensor element that was also present on the tray. After the second heating interval, the oven door was opened, the tray was withdrawn, and the shield was removed. The baked chicken was at 190° F., the whipped potatoes and vegetables were at 160° F., the Scotts' broth was at 185° F., and the beverage water was at 210° F. The ice cream and the other items in the protected region were practically unchanged in temperature.

The ability of the present invention to achieve a non-uniform distribution of energy to heat complete meals in a single operation is advantageously combined with the ability of a ferrite sensor to automatically adjust the length of heating intervals to compensate for the number and type of food items that are present within the oven. The resultant combination is a fully automated heating system. A tray loaded with food items is placed into the oven, and the oven door is closed. When the items have been fully heated, the "serve" lamp 119 signals that the items may be removed from the oven. There is no need to set a timer or to compensate for the quantity or initial temperature of the items upon the tray. Items positioned in the heating regions 302, 304, and 306 each receive the desired amount of energy relative to the other items and to the sensor. In an institutional environment where a variety of differing meals are to be served, use of the present invention reduces the training needed by personnel for oven operation and eliminates the possibility of under-or overheating a meal.

The oven 100 and its various accessories are described above in conjunction with the heating of food. The same or a similar arrangement may be used to heat other types of loads. As an example, articles to be heated may comprise plastic, rubber or pharmaceutical items that are to be thawed or warmed and timer control or manual control may be substituted for the ferrite sensor disclosed herein.

Although the present invention has been described with reference to a number of illustrative embodiments thereof, it should be understood that numerous other modifications and embodiments may be devised by those skilled in the art that fall within the scope of the present invention.

What is claimed as new and desired to be secured by letters Patent of the United States is:

1. A system for selectively heating items in a microwave oven comprising:

a chamber having conductive walls and a conductive floor;

means for supplying microwave energy to the interior of said chamber;

a tray positioned within said chamber;

a shield located over a portion of said tray and cooperating with said conductive floor to shield a portion of said tray from microwave energy, said shield defining an unshielded L-shaped area on said tray; and an energy-focusing inwardly directed wall of said chamber which cooperates with said shield to define a channel having conductive walls, said channel being adjacent one branch of said unshielded L-shaped area on said tray, thereby to concentrate microwave energy in said one branch of said L-shaped area.

2. The combination of claim 1, wherein said inwardly directed wall slopes downwardly to concentrate microwave energy in said one branch of said L-shaped area.

* * * * *